(12) United States Patent
Horita

(10) Patent No.: US 11,451,251 B2
(45) Date of Patent: Sep. 20, 2022

(54) RADIO FREQUENCY MODULE AND COMMUNICATION DEVICE

(71) Applicant: Murata Manufacturing Co., Ltd., Nagaokakyo (JP)

(72) Inventor: Atsushi Horita, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 17/075,710

(22) Filed: Oct. 21, 2020

(65) Prior Publication Data

US 2021/0135693 A1   May 6, 2021

(30) Foreign Application Priority Data

Oct. 31, 2019 (JP) .............................. JP2019-199461

(51) Int. Cl.
| | | |
|---|---|---|
| H04B 1/04 | (2006.01) | |
| H04B 1/10 | (2006.01) | |
| H01Q 1/22 | (2006.01) | |

(52) U.S. Cl.
CPC ......... *H04B 1/0458* (2013.01); *H01Q 1/2283* (2013.01); *H04B 1/0475* (2013.01); *H04B 1/1018* (2013.01); *H04B 2001/0408* (2013.01)

(58) Field of Classification Search
CPC ...... H04B 1/0458; H04B 1/18; H04B 1/0475; H01Q 1/2283
USPC ........................................ 375/262, 295, 297
See application file for complete search history.

(56) References Cited

U.S. PATENT DOCUMENTS

| | | | |
|---|---|---|---|
| 2007/0058748 A1* | 3/2007 | Kim | H04B 1/52 375/295 |
| 2017/0026071 A1* | 1/2017 | Young | H01L 23/49827 |
| 2017/0063412 A1* | 3/2017 | Ripley | H04B 1/18 |
| 2018/0226367 A1* | 8/2018 | Babcock | H03F 1/347 |
| 2019/0115309 A1* | 4/2019 | Modi | H03H 9/0547 |
| 2020/0127690 A1* | 4/2020 | Soga | H01Q 1/2283 |

FOREIGN PATENT DOCUMENTS

| | | |
|---|---|---|
| JP | 2005-136394 A | 5/2005 |
| JP | 2007-188916 A | 7/2007 |
| WO | 2008/054012 A1 | 5/2008 |
| WO | 2018/168500 A1 | 9/2018 |

OTHER PUBLICATIONS

Korean Office Action dated Nov. 4, 2021, in corresponding Korean Patent Application No. 10-2020-0132392.

* cited by examiner

*Primary Examiner* — Emmanuel Bayard
(74) *Attorney, Agent, or Firm* — Xsensus LLP

(57) ABSTRACT

A radio frequency module includes a mounting board, a low noise amplifier, a reception filter, and an input matching circuit. The low noise amplifier is mounted on the mounting board. The reception filter is connected to the low noise amplifier. The input matching circuit is provided on a signal path between the reception filter and the low noise amplifier. The input matching circuit includes at least one inductor. The reception filter is disposed on the low noise amplifier. The at least one inductor included in the input matching circuit is adjacent to the low noise amplifier such that no other circuit element is present between the low noise amplifier and the at least one inductor.

20 Claims, 10 Drawing Sheets

RADIO FREQUENCY MODULE AND COMMUNICATION DEVICE

CROSS REFERENCE TO RELATED APPLICATION

The present application is based on and claims priority of Japanese Patent Application No. 2019-199461 filed on Oct. 31, 2019. The entire disclosure of the above-identified application, including the specification, drawings, and claims, is incorporated herein by reference in its entirety.

TECHNICAL FIELD

The present disclosure is generally related to a radio frequency (RF) module and a communication device, and more specifically related to a radio frequency module including a reception filter and a low noise amplifier, and a communication device including the radio frequency module.

BACKGROUND

A radio frequency module that includes a reception filter and a low noise amplifier is known (for example, see U.S. Patent Application Publication No. 2019/0115309).

The radio frequency module disclosed in U.S. Patent Application Publication No. 2019/0115309 includes a SAW filter (reception filter), a low noise amplifier, and a surface mount component such as an inductor. In the radio frequency module disclosed in U.S. Patent Application Publication No. 2019/0115309, the SAW filter is disposed on a mounting board, and the low noise amplifier is disposed on the SAW filter. The surface mount component is disposed on the mounting board. In the radio frequency module disclosed in U.S. Patent Application Publication No. 2019/0115309, the surface mount component, such as an inductor, is electrically connected to the low noise amplifier disposed on the SAW filter by wire bonding.

SUMMARY

Technical Problems

With the conventional radio frequency module disclosed in U.S. Patent Application Publication No. 2019/0115309, the inductor disposed on the mounting board is electrically connected to the low noise amplifier disposed on the reception filter, as described above.

Consequently, the wiring length between the inductor and the low noise amplifier is long, which makes it easy for parasitic capacitance to occur between the inductor and the low noise amplifier. The noise figure (NF) of the low noise amplifier may increase in the conventional radio frequency module as result of parasitic capacitance occurring.

The present disclosure has been conceived in view of the above-identified and other problems, and provides a radio frequency module and a communication device that can reduce the NF of the low noise amplifier.

Solutions to Problems

A radio frequency module according to one aspect of the present disclosure includes a mounting board, a low noise amplifier, a reception filter, and an input matching circuit. The low noise amplifier is mounted on the mounting board. The reception filter is connected to the low noise amplifier. The input matching circuit is provided on a signal path between the reception filter and the low noise amplifier, and includes at least one inductor. The reception filter is disposed on the low noise amplifier. The at least one inductor included in the input matching circuit is adjacent to the low noise amplifier such that no other circuit element is present between the low noise amplifier and the at least one inductor.

A communication device according to one aspect of the present disclosure includes the radio frequency module and a signal processing circuit. The signal processing circuit processes a reception signal from the radio frequency module.

Advantageous Effects

With the radio frequency module and the communication device according to these aspects of the present disclosure, it is possible to reduce the NF of the low noise amplifier.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, a radio frequency module and a communication device according to Embodiments 1 through 6 will be described with reference to the drawings. FIG. 1, FIG. 2, FIG. 5 through FIG. 7, and FIG. 10 referenced in the following Embodiments and the like are schematic figures in which the dimensional ratios of the sizes and thicknesses of the elements do not necessarily represent actual dimensional ratios.

Embodiment 1

(1) Radio Frequency Module

Radio frequency module 1 according to Embodiment 1 will be described with reference to the drawings.

Figure 3:
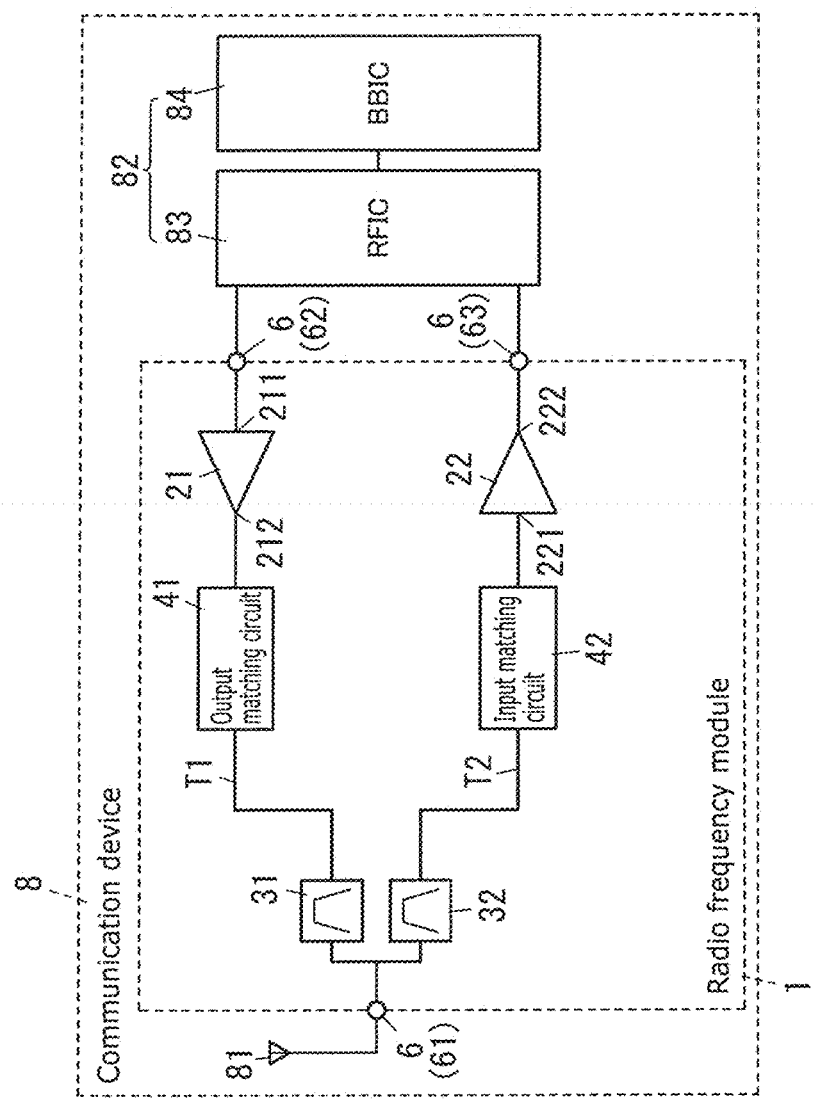
FIG. 3 is a schematic diagram of a communication device according to Embodiment 1.

As illustrated in FIG. 3, radio frequency module 1 according to Embodiment 1 includes power amplifier 21, low noise amplifier 22, transmission filter 31, and reception filter 32. Radio frequency module 1 also includes output matching circuit 41 and input matching circuit 42. In this exemplary configuration the communication device is a multi-band transceiver. As used in this specification the term "module", as used with "radio frequency module", or "RF front-end module" should be construed as circuitry (programmable, as well as discrete) and associated circuit components, such as circuit boards, RF shielding, etc.

Figure 1:
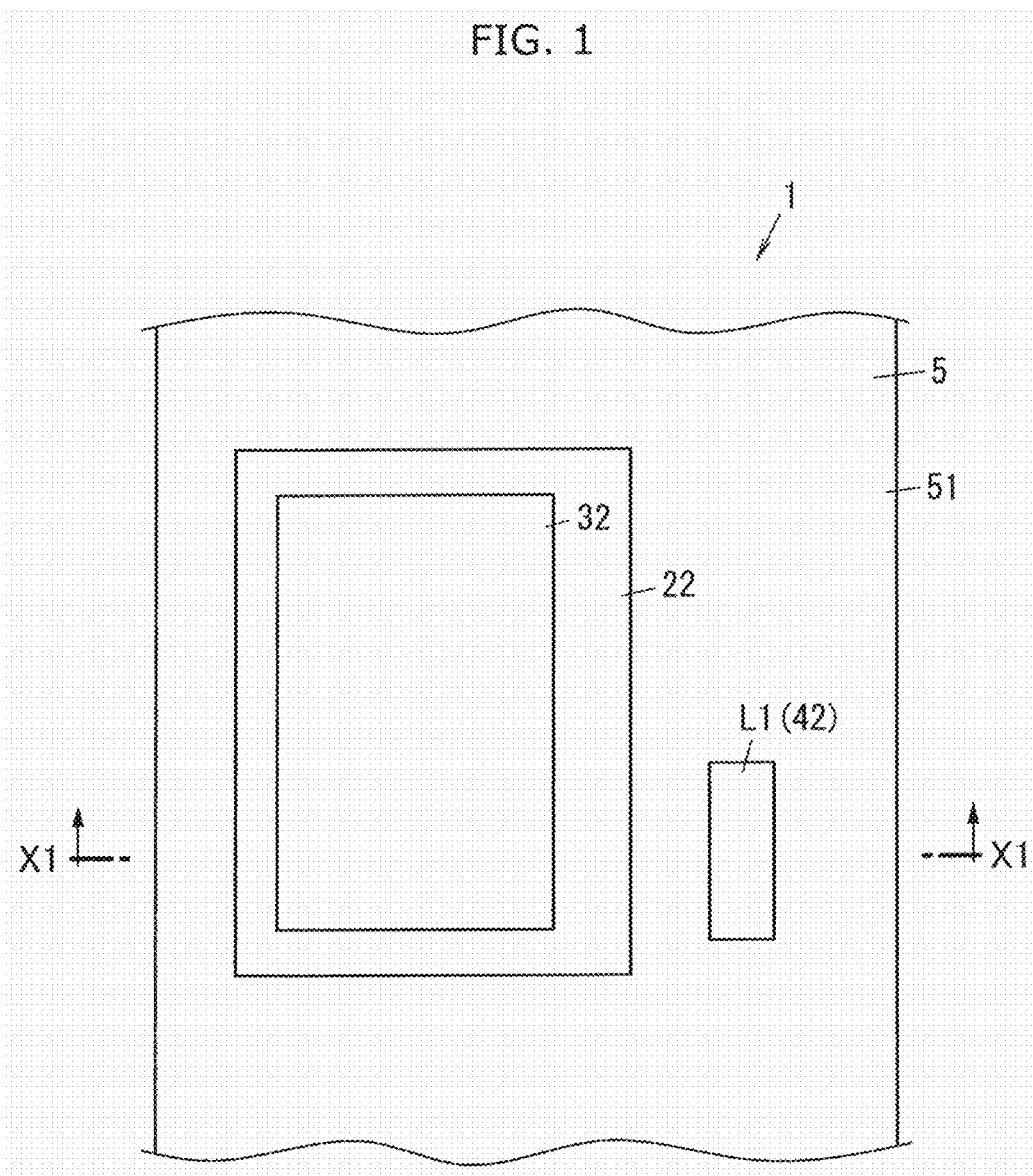
FIG. 1 is a plan view of a radio frequency module (or RF front-end circuitry) according to Embodiment 1.
Figure 2:
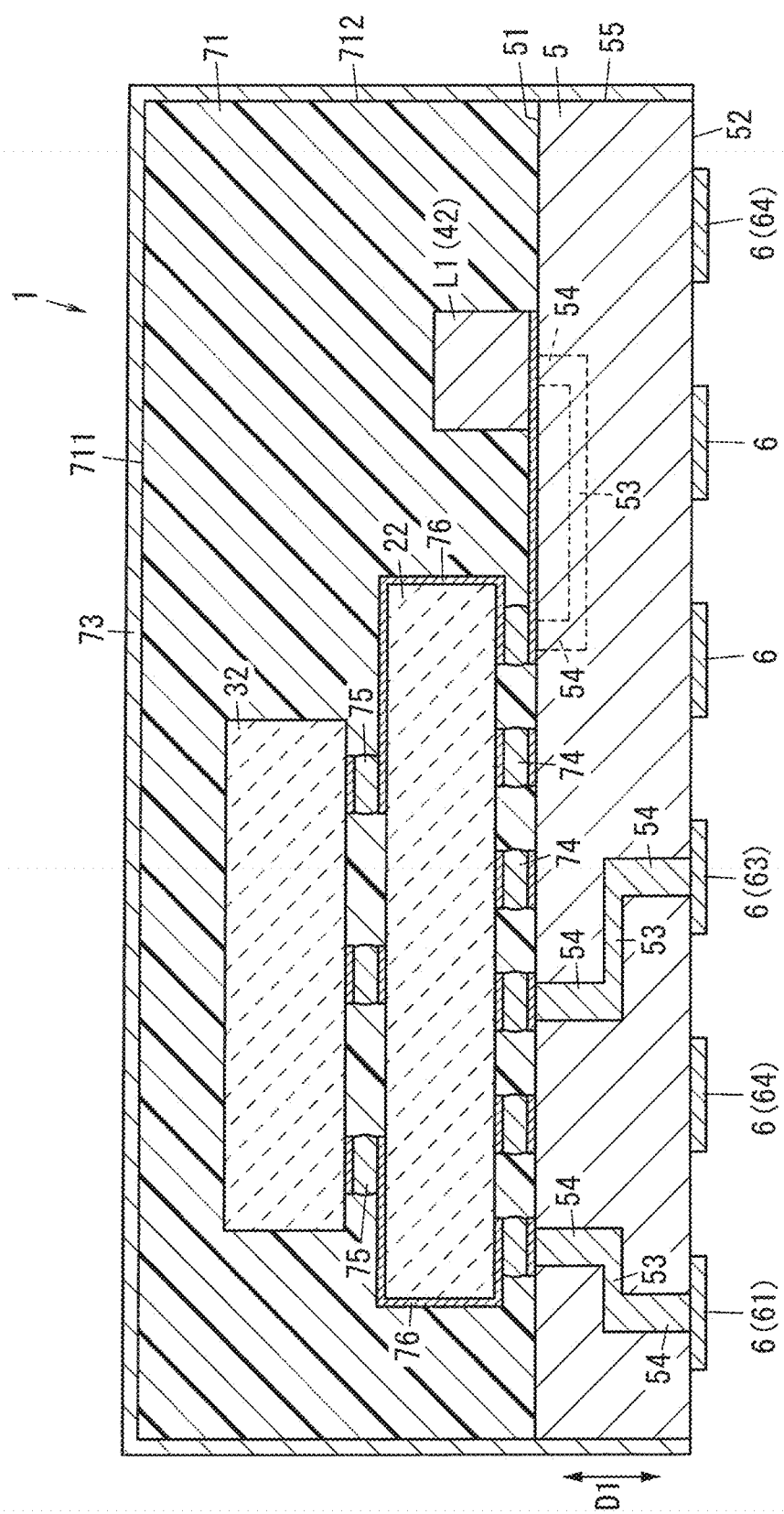
FIG. 2 is a cross sectional view of the radio frequency module taken along line X1-X1 in FIG. 1.

As illustrated in FIG. 1 and FIG. 2, radio frequency module 1 further includes mounting board 5, a plurality of external-connection terminals 6, and first resin component 71.

As illustrated in FIG. 3, radio frequency module 1 is used in, for example, communication device 8. For example, communication device 8 is a mobile phone such as a smartphone. However, communication device 8 is not limited to a mobile phone, and may be, for example, a wearable terminal such as a smart watch. Radio frequency module 1 is a module that may support, for example, the fourth generation mobile communication (4G) standard and the fifth generation mobile communication (5G) standard. The 4G standard is, for example, the 3GPP Long Term Evolution (LTE) standard. The 5G standard is, for example, 5G New Radio (NR). Radio frequency module 1 is a module that may support carrier aggregation and dual connectivity.

Radio frequency module 1 communicates using a first communication band. More specifically, radio frequency module 1 transmits transmission signals of the first communication band and receives reception signals of the first communication band.

The transmission signals and the reception signals are, for example, frequency division duplex (FDD) signals. FDD is a wireless communication technique in which transmission and reception in wireless communication are assigned with different frequency bands, and transmission and reception are performed. Note that the transmission signals and the reception signals are not limited to FDD signals, and may be time division duplex (TDD) signals. TDD is a wireless communication technique in which transmission and reception in wireless communication are assigned with the same frequency band, and transmission and reception are switched based on time slots.

(2) Radio Frequency Module Circuit Configuration

Hereinafter, a circuit configuration of radio frequency module 1 according to Embodiment 1 will be described with reference to the drawings. In this example, the transmission signals and the reception signals are exemplified as FDD signals. In the following, a "transmission path" means a transfer route that includes, for instance, a line through which a radio frequency transmission signal propagates, an electrode directly connected to the line, and a terminal directly connected to the line or the electrode. Further, a "reception path" means a transfer route that includes, for instance, a line through which a radio frequency reception signal propagates, an electrode directly connected to the line, and a terminal directly connected to the line or the electrode. In addition, a "transmission and reception path" means a transfer route that includes, for instance, a line through which a radio frequency transmission signal and a radio frequency reception signal propagate, an electrode directly connected to the line, and a terminal directly connected to the line or the electrode. Furthermore, as used herein the terms "circuit" or "circuitry" means one or more circuits, including discrete circuit(s) as well as circuit board(s) and combinations thereof.

(2.1) Power Amplifier

Power amplifier 21 illustrated in FIG. 3 is an amplifier that amplifies the amplitude of transmission signals. On transmission path T1 that connects antenna terminal 61 and input terminal 62, power amplifier 21 is provided between input terminal 62 and output matching circuit 41. Power amplifier 21 includes input terminal 211 and output terminal 212. Input terminal 211 of power amplifier 21 is connected to an external circuit (for example, signal processing circuit 82) via input terminal 62. Input terminal 62 is a terminal through which radio frequency signals (transmission signals) are input into radio frequency module 1 from an external circuit. Output terminal 212 of power amplifier 21 is connected to output matching circuit 41.

(2.2) Low Noise Amplifier

Low noise amplifier 22 FIG. 3 is an amplifier that amplifies, with low noise, the amplitude of reception signals. Low noise amplifier 22 is provided on reception path T2, between input matching circuit 42 and output terminal 63. Low noise amplifier 22 includes input terminal 221 and output terminal 222. Input terminal 221 of low noise amplifier 22 is connected to input matching circuit 42. Output terminal 222 of low noise amplifier 22 is connected to an external circuit (for example, signal processing circuit 82) via output terminal 63. Output terminal 63 is a terminal through which radio frequency signals (reception signals) are output to an external circuit from low noise amplifier 22.

(2.3) Transmission Filter

Transmission filter 31 illustrated in FIG. 3 has a communication band that passes the transmission signals. More specifically, transmission filter 31 is provided on transmission path T1, between output matching circuit 41 and antenna terminal 61. Among radio frequency signals amplified by power amplifier 21, transmission filter passes transmission signals of a transmission band of the communication band described above.

(2.4) Reception Filter

Reception filter 32 illustrated in FIG. 3 has a communication band that passes the reception signals. More specifically, on reception path T2 that connects antenna terminal 61 and output terminal 63, reception filter 32 is provided between antenna terminal 61 and input matching circuit 42. Reception filter 32 is connected to low noise amplifier 22 via reception path T2. Among radio frequency signals input from antenna terminal 61, reception filter 32 passes reception signals of a reception band of the communication band described above.

(2.5) Output Matching Circuit

As illustrated in FIG. 3, output matching circuit 41 is provided on the signal path between power amplifier 21 and transmission filter 31. On transmission path T1, output matching circuit 41 is provided between output terminal 212 of power amplifier 21 and transmission filter 31. Output matching circuit 41 is a circuit for matching impedance between power amplifier 21 and transmission filter 31.

Output matching circuit 41 is configured of a plurality of inductors (not illustrated in the drawings) and a plurality of capacitors (not illustrated in the drawings). However, output matching circuit 41 is not limited to being configured of a plurality of inductors and a plurality of capacitors. For example, output matching circuit 41 may be configured of a plurality of inductors alone, and, alternatively, may be configured of a plurality of capacitors alone. Alternatively, output matching circuit 41 may be configured of a single inductor, and, alternatively, may be configured of a single capacitor.

(2.6) Input Matching Circuit

As illustrated in FIG. 3, input matching circuit 42 is provided on the signal path between reception filter 32 and low noise amplifier 22. Input matching circuit 42 is provided on reception path T2, between reception filter 32 and input terminal 221 of low noise amplifier 22. Input matching circuit 42 is a circuit for impedance matching reception filter 32 and low noise amplifier 22.

Figure 4A:
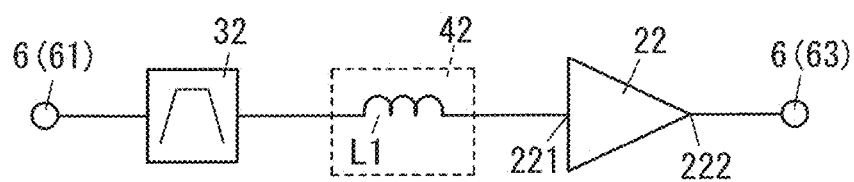
FIG. 4A is a schematic diagram of an input matching circuit of the radio frequency module according to Embodiment 1.
Figure 4B:
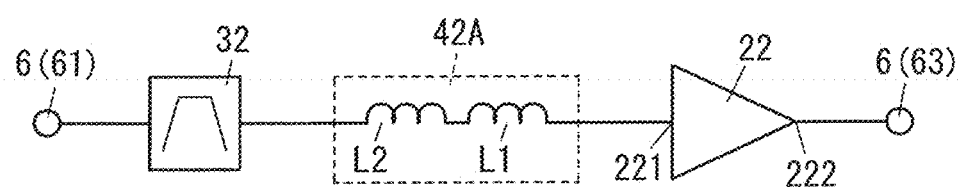
FIG. 4B is a schematic diagram of an input matching circuit of a radio frequency module according to Variation 1 of Embodiment 1.
Figure 4C:
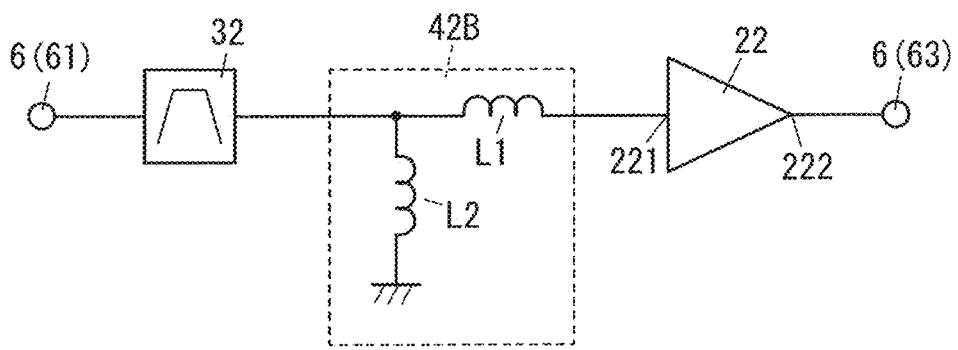
FIG. 4C is a schematic diagram of an input matching circuit of a radio frequency module according to Variation 2 of Embodiment 1.

As illustrated in FIG. 4A, input matching circuit 42 is configured of a single inductor L1. However, input matching circuit 42 is not limited to being configured of a single inductor L1. For example, as illustrated in FIG. 4B and FIG. 4C, input matching circuit 42 may be configured of a plurality of inductors, namely inductor L1 and inductor L2, and, alternatively, may be configured of a plurality of inductors and a plurality of capacitors. In other words, input matching circuit 42 includes at least one inductor L1.

(3) Radio Frequency Module Structure

Hereinafter, the structure of radio frequency module 1 according to Embodiment 1 will be described with reference to the drawings.

As illustrated in FIG. 1 and FIG. 2, radio frequency module 1 includes mounting board 5, a plurality of circuit elements, a plurality of external-connection terminals 6 (six external-connection terminals 6 in the example illustrated in the figures), first resin component 71, and shield layer 73. The plurality of circuit elements included in radio frequency module 1 include power amplifier 21, low noise amplifier 22, transmission filter 31, reception filter 32, output matching circuit 41, and input matching circuit 42. In FIG. 1 and FIG. 2, among the plurality of circuit elements, illustration of circuit elements other than low noise amplifier 22, reception filter 32, and inductor L1 of input matching circuit 42 is omitted.

Radio frequency module 1 is electrically connectable to a motherboard (not illustrated in the drawings). The motherboard corresponds to, for example, a motherboard of a mobile phone, communication device or the like. Note that radio frequency module being electrically connectable to a motherboard includes configurations in which radio frequency module 1 is indirectly mounted on a motherboard in addition to configurations in which radio frequency module 1 is directly mounted on a motherboard. Radio frequency module 1 being indirectly mounted on a motherboard means, for example, radio frequency module 1 is mounted on another radio frequency module that is mounted on the motherboard.

(3.1) Mounting Board

As illustrated in FIG. 1 and FIG. 2, mounting board 5 includes first principal surface 51 and second principal surface 52. First principal surface 51 and second principal surface 52 are on opposite sides of mounting board 5 in thickness direction D1 of mounting board 5. When radio frequency module 1 is provided on a motherboard (not illustrated in the drawings), second principal surface 52 faces the motherboard.

Mounting board 5 is a multilayer board configured of a plurality of stacked dielectric layers. Mounting board 5 includes a plurality of conductive patterns 53 and a plurality of columnar electrodes 54. Although the term "columnar" is used, it should be understood that the columnar electrodes need not be a straight column, but includes a conductive path that extends through a thickness direction D1 of the mounting board 5. The plurality of conductive patterns 53 include a conductive pattern set to a ground potential. The plurality of columnar electrodes 54 are used to electrically connect circuit elements mounted on first principal surface 51 with conductive patterns 53 of mounting board 5. The plurality of columnar electrodes 54 are also used to electrically connect (i) circuit elements mounted on first principal surface 51 and conductive patterns 53 of mounting board 5 with (ii) external-connection terminals 6.

(3.2) Power Amplifier

Although not illustrated in FIG. 1 or FIG. 2, power amplifier 21 is disposed on first principal surface 51 of mounting board 5. More specifically, power amplifier 21 is mounted on first principal surface 51 of mounting board 5. Note that part of power amplifier 21 may be mounted on first principal surface 51 of mounting board 5, and the remainder of power amplifier 21 may be incorporated into mounting board 5. In other words, in mounting board 5, power amplifier 21 is provided closer to first principal surface 51 than to second principal surface 52.

(3.3) Output Matching Circuit

Although not illustrated in FIG. 1 or FIG. 2, output matching circuit 41 is disposed on mounting board 5. As described above, output matching circuit 41 includes an inductor (not illustrated in the drawings). For example, the inductor of output matching circuit 41 is an element in the form of a chip that is mounted on first principal surface 51 of mounting board 5 (i.e., a chip inductor), or a conductive pattern provided on mounting board 5 (i.e., a line inductor). When the inductor in output matching circuit 41 is implemented as a chip inductor, the inductor has a quadrilateral outline in plan view of mounting board 5 in thickness direction D1.

(3.4) Transmission Filter

Although not illustrated in FIG. 1 or FIG. 2, transmission filter 31 is disposed on first principal surface 51 of mounting board 5. More specifically, transmission filter 31 is mounted on first principal surface 51 of mounting board 5. Note that part of transmission filter 31 may be mounted on first principal surface 51 of mounting board 5, and the remainder of transmission filter 31 may be incorporated into mounting board 5. In other words, in mounting board 5, transmission filter 31 is provided closer to first principal surface 51 than to second principal surface 52.

For example, transmission filter 31 is an acoustic wave filter including a plurality of series arm resonators and a plurality of parallel arm resonators. The acoustic wave filter is, for example, a surface acoustic wave (SAW) filter that uses surface acoustic waves. Furthermore, transmission filter 31 may include at least one of an inductor or a capacitor that is connected in series or parallel to any of the plurality of series arm resonators, and may include an inductor or a capacitor that is connected in series or parallel to any of the plurality of parallel arm resonators.

(3.5) Reception Filter

For example, just like transmission filter 31, reception filter 32 is an acoustic wave filter including a plurality of series arm resonators and a plurality of parallel arm resonators. The acoustic wave filter is, for example, a SAW filter that uses surface acoustic waves. Furthermore, reception filter 32 may include at least one of an inductor or a capacitor that is connected in series or parallel to any of the plurality of series arm resonators, and may include an inductor or a capacitor that is connected in series or parallel to any of the plurality of parallel arm resonators.

(3.6) Input Matching Circuit

As illustrated in FIG. 1 and FIG. 2, input matching circuit 42 is disposed on first principal surface 51 of mounting board 5. As described above, input matching circuit 42 includes inductor L1. Inductor L1 in input matching circuit 42 is at least part of a surface mount component or an integrated passive device. For example, inductor L1 is an element in the form of a chip that is mounted on first principal surface 51 of mounting board 5 (i.e., a chip inductor), or a conductive pattern provided on mounting board 5 (i.e., a line inductor). In the example illustrated in FIG. 1 and FIG. 2, inductor L1 in input matching circuit 42 is mounted on first principal surface 51 of mounting board 5. In other words, in mounting board 5, input matching circuit 42 is provided closer to first principal surface 51 than to second principal surface 52. When inductor L1 in input matching circuit 42 is implemented as a chip inductor, inductor L1 has a quadrilateral outline in plan view of mounting board 5 in thickness direction D1.

(3.7) Low Noise Amplifier

As illustrated in FIG. 1 and FIG. 2, low noise amplifier 22 is disposed on first principal surface 51 of mounting board 5. Note that part of low noise amplifier 22 may be mounted on first principal surface 51 of mounting board 5, and the remainder of low noise amplifier 22 may be incorporated into mounting board 5. In other words, low noise amplifier 22 is provided on the first principal surface 51 side of mounting board 5, and at least includes a part mounted on first principal surface 51.

(3.8) External-Connection Terminals

The plurality of external-connection terminals 6 illustrated in FIG. 1 and FIG. 2 are terminals for electrically connecting mounting board 5 to a motherboard (not illustrated in the drawings). The plurality of external-connection terminals 6 include antenna terminal 61, input terminal 62, and output terminal 63 illustrated in FIG. 3, and the plurality of ground electrodes 64. The plurality of ground electrodes 64 are terminals electrically connected to a ground terminal of the circuit board of communication device 8, and to which a ground potential is applied.

The plurality of external-connection terminals 6 are disposed on second principal surface 52 of mounting board 5. Each external-connection terminal 6 is a pad electrode. A pad electrode is, for example, a quadrilateral electrode. For example, external-connection terminals 6 are made of metal (for example, copper or a copper alloy).

Taking into consideration the mountability of radio frequency module 1 to the motherboard and the desire to increase the number of ground electrodes of radio frequency module 1, a plurality of external-connection terminals 6 are provided in radio frequency module 1.

(3.9) First Resin Component

As illustrated in FIG. 2, first resin component 71 is disposed on first principal surface 51 of mounting board 5, and covers the plurality of circuit elements disposed on first principal surface 51 as well as first principal surface 51. First resin component 71 functions to ensure the reliability of mechanical strength (impact resistance) and moisture resistance and the like of circuit elements disposed on first principal surface 51. In other words, first resin component 71 functions to protect circuit elements disposed on first principal surface 51. First resin component 71 may include a filler in addition to resin.

(3.10) Shield Layer

Shield layer 73 covers principal surface 711 of first resin component 71, outer peripheral surface 712 of first resin component 71, and outer peripheral surface 55 of mounting board 5. For example, shield layer 73 is made of metal. Shield layer 73 contacts the ground layer of mounting board 5. This gives shield layer 73 the same potential as the ground layer.

(3.11) Arrangement of Circuit Elements

Power amplifier 21, low noise amplifier 22, transmission filter 31, output matching circuit 41, and input matching circuit 42 are mounted on first principal surface 51 of mounting board 5.

In radio frequency module 1 according to Embodiment 1, reception filter 32 is disposed on low noise amplifier 22. More specifically, reception filter 32 is disposed on low noise amplifier 22, on the first principal surface 51 side of mounting board 5.

Reception filter 32 is joined to low noise amplifier 22 by a plurality of bumps 75. Reception filter 32 is mounted to mounting board 5 via low noise amplifier 22. Among reception filter 32 and low noise amplifier 22, which are stacked in thickness direction D1 of mounting board 5, low noise amplifier 22 is larger in plan view in thickness direction D1. Note that reception filter 32 and low noise amplifier 22 may be the same size.

Inductor L1 in input matching circuit 42 is adjacent to low noise amplifier 22. Inductor L1 is disposed on mounting board 5. More specifically, inductor L1 is mounted on first principal surface 51 of mounting board 5. In other words, inductor L1 is adjacent to low noise amplifier 22 on first principal surface 51 of mounting board 5. Here, "inductor L1 is adjacent to low noise amplifier 22" means that inductor L1 and low noise amplifier 22 are next to one another in a state in which no other circuit element is present between inductor L1 and low noise amplifier 22. In an example embodiment, the inductor L1 is located within 5 widths (i.e., between 5 and 0 widths) of a housing of the inductor L1. Here, a "circuit element" refers to an element having an arbitrary function in the circuit, and includes, in addition to chip components disposed on the mounting board, elements configured as a conductive pattern disposed on the mounting board.

In radio frequency module 1 according to Embodiment 1, reception filter 32 and inductor L1 in input matching circuit 42 are electrically connected via, for example, line 76. Line 76 is provided along a side surface of low noise amplifier 22.

Inductor L1 in input matching circuit 42 and low noise amplifier 22 are electrically connected via conductive pattern 53 and columnar electrodes 54. Conductive pattern 53 and columnar electrodes 54 can reduce the parasitic capacitance between inductor L1 and low noise amplifier 22. This allows radio frequency module 1 according to Embodiment 1 to reduce the noise figure (NF) of low noise amplifier 22.

Low noise amplifier 22 is formed using a silicon on insulator (SOI) substrate or a SiGe substrate. This makes it possible to reduce noise.

(4) Detailed Structures of Elements in Radio Frequency Module (4.1) Mounting Board Mounting board 5 illustrated in FIG. 1 and FIG. 2 is, for example, a printed wiring board or a low temperature co-fired ceramics (LTCC) board. Here, mounting board 5 is, for example, a multilayer board including a plurality of dielectric layers and a plurality of conductive patterns 53. The plurality of dielectric layers and the plurality of conductive patterns 53 are stacked in thickness direction D1 of mounting board 5. The plurality of conductive patterns 53 are each formed in a predetermined pattern. Each conductive pattern 53 includes one or a plurality of conductive portions in a plane intersecting thickness direction D1 of mounting board 5. For example, each conductive pattern 53 is made of copper.

First principal surface 51 and second principal surface 52 of mounting board 5 are separated from each other in thickness direction D1 of mounting board 5. First principal surface 51 of mounting board 5 is, for example, orthogonal to thickness direction D1 of mounting board 5, but may include a side surface of a conductive portion or the like as a surface that is not orthogonal to thickness direction D1. Similarly, second principal surface 52 of mounting board 5 is, for example, orthogonal to thickness direction D1 of mounting board 5, but may include a side surface of a conductive portion or the like as a surface that is not orthogonal to thickness direction D1. First principal surface 51 and second principal surface 52 of mounting board 5 may have minute uneven structures, recesses, or protrusions.

(4.2) Filters

Next, the structures of transmission filter 31 and reception filter 32 will be described in greater detail. The following description does not distinguish between transmission filter 31 and reception filter 32, and uses the plain terminology "filter".

The filter is a single chip. Here, in the filter, each of the plurality of series arm resonators and plurality of parallel arm resonators is configured as an acoustic wave resonator, for example. In such cases, the filter includes, for example, a substrate, a piezoelectric layer, and a plurality of inter-digital transducer (IDT) electrodes. The substrate includes a first surface and a second surface. The piezoelectric layer is provided on the first surface of the substrate. The piezoelectric layer is provided on a low acoustic velocity film. The plurality of IDT electrodes are provided on the piezoelectric layer. Here, the low acoustic velocity film is provided directly or indirectly on the substrate. The piezoelectric layer is provided directly or indirectly on the low acoustic velocity film. An acoustic velocity of a bulk wave that propagates through the low acoustic velocity film is lower than an acoustic velocity of a bulk wave that propagates through the piezoelectric layer. An acoustic velocity of a bulk wave that propagates through the substrate is higher than an acoustic velocity of an acoustic wave that propagates through the piezoelectric layer. For example, the piezoelectric layer is made of lithium tantalate. For example, the low acoustic velocity film is made of silicon oxide. The substrate is, for example, a silicon substrate. The thickness of the piezoelectric layer is, for example, $3.5\lambda$ or less, where $\lambda$ is the wavelength of the acoustic wave determined by the electrode finger cycle of the IDT electrode. The thickness of the low acoustic velocity film is, for example, $2.0\lambda$ or less.

For example, the piezoelectric layer may be formed from any of lithium tantalate, lithium niobate, zinc oxide, aluminum nitride, or lead zirconate titanate. The low acoustic velocity film may include at least one type of material selected from the group consisting of: glass; silicon oxynitride; tantalum oxide; silicon oxide; or a chemical compound produced by adding fluorine, carbon, or boron to silicon oxide. The substrate may include at least one type of material selected from the group consisting of silicon, aluminum nitride, aluminum oxide, silicon carbide, silicon nitride, sapphire, lithium tantalate, lithium niobate, crystal, alumina, zirconia, cordierite, mullite, steatite, forsterite, magnesia, and diamond.

The filter further includes, for example, a spacer layer and a cover component. The spacer layer and the cover component are provided on the first surface of the substrate. The spacer layer surrounds the plurality of IDT electrodes in plan view in the thickness direction of the substrate. The spacer layer has the shape of a frame (quadrilateral frame) in plan view in the thickness direction of the substrate. The spacer layer has electrical insulating properties. For example, the spacer layer is made of a synthetic resin such as epoxy resin or polyimide. The cover component has a flat, plate-like shape. The cover component has, but is not limited to, a rectangular shape in plan view in the thickness direction of the substrate; the cover component may have a square shape in plan view in the thickness direction of the substrate. In the filter, in plan view in the thickness direction of the substrate, the external size of the cover component and the external size of the spacer layer are approximately the same. The cover component is disposed on the spacer layer so as to face the substrate in the thickness direction of the substrate. The cover component overlaps with the plurality of IDT electrodes in the thickness direction of the substrate, and is separated from the plurality of IDT electrodes in the thickness direction of the substrate. The cover component has electrical insulating properties. For example, the cover component is made of a synthetic resin such as epoxy resin or polyimide. The filter includes a space surrounded by the substrate, the spacer layer, and the cover component. A gas is in the space in the filter. The gas is, for example, air or an inert gas (such as nitrogen gas). The plurality of terminals are exposed from the cover component. Each of the plurality of terminals is, for example, a bump. Each bump is, for example, a solder bump. Each bump is not limited to a solder bump, and may be, for example, a gold bump.

For example, the filter may include an adhesive layer interposed between the low acoustic velocity film and the piezoelectric layer. For example, the adhesive layer is made of resin (epoxy resin, polyimide resin). The filter may include a dielectric film between the low acoustic velocity film and the piezoelectric layer, above the piezoelectric layer, and/or below the low acoustic velocity film.

For example, the filter may also include a high acoustic velocity film interposed between the substrate and the low acoustic velocity film. Here, the high acoustic velocity film is provided directly or indirectly on the substrate. The low acoustic velocity film is provided directly or indirectly on the high acoustic velocity film. The piezoelectric layer is provided directly or indirectly on the low acoustic velocity film. An acoustic velocity of a bulk wave that propagates through the high acoustic velocity film is higher than an acoustic velocity of an acoustic wave that propagates through the piezoelectric layer. An acoustic velocity of a bulk wave that propagates through the low acoustic velocity film is lower than an acoustic velocity of a bulk wave that propagates through the piezoelectric layer.

The high acoustic velocity film is made of a piezoelectric body such as diamond-like carbon, aluminum nitride, aluminum oxide, silicon carbide, silicon nitride, silicon, sapphire, lithium tantalate, lithium niobate, or crystal, a ceramic material such as alumina, zirconia, cordierite, mullite, steatite, or forsterite, magnesia, diamond, a material whose main component is any one of these materials, or a material whose main component is a composite of any of these materials.

Because the high acoustic velocity film functions to trap acoustic waves in the piezoelectric layer and the low acoustic velocity layer, the thicker the high acoustic velocity film, the more desirable. The piezoelectric substrate may include, for example, an adhesive layer or dielectric film as a film other than the high acoustic velocity film, the low acoustic velocity film, and the piezoelectric layer.

Each of the plurality of series arm resonators and plurality of parallel arm resonators is not limited to an acoustic wave resonator like described above, and may be a SAW resonator or a bulk acoustic wave (BAW) resonator. Here, a SAW resonator includes, for example, the piezoelectric substrate and IDT electrodes provided on the piezoelectric substrate. When the plurality of series arm resonators and plurality of parallel arm resonators are each implemented as a SAW resonator, the filter includes, on a single piezoelectric substrate, a plurality of IDT electrodes provided in one-to-one correspondence with each of the plurality of series arm resonators, and a plurality of IDT electrodes provided in one-to-one correspondence with each of the plurality of parallel arm resonators. For example, the piezoelectric substrate is a lithium tantalate substrate or lithium niobate substrate.

(4.3) Power Amplifier

For example, power amplifier 21 illustrated in FIG. 3 is a single IC chip including a substrate and an amplifying function part. The substrate includes a first surface and a second surface on opposite sides of the substrate. The substrate is, for example, a gallium arsenide substrate. The amplifying function part includes at least one transistor formed on the first surface of the substrate. The amplifying function part functions to amplify transmission signals of a predetermined frequency band. The at least one transistor is, for example, a heterojunction bipolar transistor (HBT). In power amplifier 21, power supply voltage from a controller (not illustrated in the drawings) is applied between the collector and the emitter of the HBT. For example, power amplifier 21 may include, in addition to the amplifying function part, a DC-cut capacitor. For example, power amplifier 21 is mounted to first principal surface 51 of mounting board 5 using a flip chip method so that the first surface of the substrate opposes first principal surface 51 of the mounting board 5. Power amplifier 21 has a quadrilateral outline in plan view of mounting board 5 in thickness direction D1.

(4.4) Low Noise Amplifier

For example, low noise amplifier 22 illustrated in FIG. 1 and FIG. 2 is a single IC chip including a substrate and an amplifying function part. The substrate includes a first surface and a second surface on opposite sides of the substrate. The substrate is, for example, a silicon substrate. The amplifying function part is formed on the first surface of the substrate. The amplifying function part functions to amplify reception signals of a predetermined frequency band. For example, low noise amplifier 22 is mounted to first principal surface 51 of mounting board 5 using a flip chip method so that the first surface of the substrate opposes mounting board 5. Low noise amplifier 22 has a quadrilateral outline in plan view of mounting board 5 in thickness direction D1.

(5) Radio Frequency Module Manufacturing Method

In the manufacturing method of radio frequency module 1, for example, a first process of mounting the plurality of circuit elements to mounting board 5 is performed. In the first process, a step of mounting the plurality of circuit elements to first principal surface 51 of mounting board 5 is performed, and thereafter a step of disposing reception filter 32 on low noise amplifier 22 is performed. In the first process, a step of disposing the plurality of external-connection terminals 6 on second principal surface 52 of mounting board 5 is also performed. In the first process, either the step of mounting the plurality of circuit elements on first principal surface 51 of mounting board 5 or the step of disposing the plurality of external-connection terminals 6 on second principal surface 52 of mounting board 5 may be performed first.

A second process is performed after the first process described above. In the second process, a step of forming first resin component 71 that covers the plurality of circuit elements on the first principal surface 51 side of mounting board 5 is performed.

A third process is performed after the second process described above. In the third process, shield layer 73 is formed. The first process and the second process may be performed on a multi-piece substrate including a plurality of mounting boards 5 that can be individually separated. In such cases, for example, the third process may be performed after the individual mounting boards 5 have been separated from the multi-piece substrate after the second process.

The manufacturing method of radio frequency module 1 described above is merely one example; radio frequency module 1 may be manufactured using another manufacturing method.

(6) Communication Device

As illustrated in FIG. 3, communication device 8 according to Embodiment 1 includes radio frequency module 1, antenna 81, and signal processing circuit 82.

(6.1) Antenna

Antenna 81 is connected to antenna terminal 61 of radio frequency module 1. Antenna 81 includes a transmission function of radiating, over radio waves, a first transmission signal and a second transmission signal output from radio frequency module 1, and a reception function of receiving a first reception signal and a second reception signal as radio waves from an outside source and outputting the received signals to radio frequency module 1.

(6.2) Signal Processing Circuit

Signal processing circuit 82 includes RF signal processing circuit 83 and baseband signal processing circuit 84. Signal processing circuit 82 processes transmission signals and reception signals.

(6.2.1) RF Signal Processing Circuit

For example, RF signal processing circuit 83 is, for example, a radio frequency integrated circuit (RFIC), and signal processes radio frequency signals. RF signal processing circuit 83 performs signal processing such as up-converting on radio frequency signals (transmission signals) output from baseband signal processing circuit 84, and outputs the signal-processed radio frequency signals to radio frequency module 1. RF signal processing circuit 83 performs signal processing such as down-converting on radio frequency signals (reception signals) output from radio frequency module 1, and outputs the signal-processed radio frequency signals to baseband signal processing circuit 84.

(6.2.2) Baseband Signal Processing Circuit

For example, baseband signal processing circuit 84 is a baseband integrated circuit (BBIC), and performs predetermined signal processing on transmission signals from a source external to signal processing circuit 82. Reception signals processed by baseband signal processing circuit 84 are used as video signals for displaying video or as voice signals for calls, for example.

(7) Advantageous Effects

In radio frequency module 1 according to Embodiment 1, low noise amplifier 22 is mounted on mounting board 5, reception filter 32 is disposed on low noise amplifier 22, and inductor L1 in input matching circuit 42 is adjacent to low noise amplifier 22. This makes it possible to reduce the wiring length between inductor L1 in input matching circuit 42 and low noise amplifier 22, which makes it possible to inhibit the occurrence of parasitic capacitance between inductor L1 and low noise amplifier 22. This consequently makes it possible to reduce the noise figure (NF) of low noise amplifier 22.

In radio frequency module 1 according to Embodiment 1, inductor L1 is disposed on mounting board 5. This makes it possible to dispose inductor L1, which is relatively tall, adjacent to low noise amplifier 22.

In radio frequency module 1 according to Embodiment 1, reception filter 32 is a SAW filter or a BAW filter. This makes it possible to improve filtering characteristics.

In radio frequency module 1 according to Embodiment 1, low noise amplifier 22 is formed using a SOI substrate or a SiGe substrate. This makes it possible to reduce noise.

Radio frequency module 1 according to Embodiment 1 further includes transmission filter 31. This makes it possible to miniaturize radio frequency module 1 by using a configuration that includes not only a reception function but a transmission function as well.

(8) Variations

Hereinafter, variations of Embodiment 1 will be described.

As Variation 1 of Embodiment 1, radio frequency module 1 may include input matching circuit 42A like that in FIG. 4B. Input matching circuit 42A illustrated in FIG. 4B includes a plurality of inductors, namely inductor L1 and inductor L2. Inductor L1 and inductor L2 are provided in series on the signal path between reception filter 32 and low noise amplifier 22.

As Variation 2 of Embodiment 1, radio frequency module 1 may include input matching circuit 42B like that in FIG. 4C. Input matching circuit 42B illustrated in FIG. 4C includes a plurality of inductors, namely inductor L1 and inductor L2. Inductor L1 is provided on the signal path between reception filter 32 and low noise amplifier 22.

Inductor L2 is provided on a path between a node on the signal path between reception filter 32 and low noise amplifier 22, and a ground. More specifically, inductor L2 is provided on the path between a node provided between reception filter 32 and inductor L1, and a ground.

In each radio frequency module 1 according to Variation 1 and 2, inductor L1, which is the inductor among inductors L1 and L2 that is closest to low noise amplifier 22, is adjacent to low noise amplifier 22. This makes it possible to inhibit the occurrence of parasitic capacitance between inductor L1 and low noise amplifier 22 even when input matching circuit 42A and 42B includes a plurality of inductors, namely inductor L1 and inductor L2. This consequently reduces the NF of low noise amplifier 22.

Input matching circuit 42 may include a capacitor (not illustrated in the drawings) in addition to the inductor. For example, the capacitor is an element in the form of a chip that is mounted on first principal surface 51 of mounting board 5, or is configured to include two opposing conductive patterns that are incorporated into mounting board 5.

Radio frequency module 1 is not limited to a configuration including a plurality of external-connection terminals 6; radio frequency module 1 may include a single external-connection terminal 6. It is sufficient if radio frequency module 1 includes at least one external-connection terminal 6.

Mounting board 5 is not limited to being a printed wiring board or LTCC board; mounting board 5 may be a high temperature co-fired ceramics (HTCC) board or a component-embedded board, for example.

Output matching circuit 41 may include a capacitor (not illustrated in the drawings) along with the inductor. For example, the capacitor is an element in the form of a chip that is mounted on first principal surface 51 of mounting board 5, or is configured to include two opposing conductive patterns that are incorporated into mounting board 5. In other words, output matching circuit 41 is provided closer to first principal surface 51 than to second principal surface 52 on mounting board 5, and at least includes a part mounted on first principal surface 51. The inductor in output matching circuit 41 is not limited to being mounted on first principal surface 51 of mounting board 5, for example.

Radio frequency module 1 according to each variation described above achieves the same advantageous effects as radio frequency module 1 according to Embodiment 1.

Embodiment 2

Figure 5:
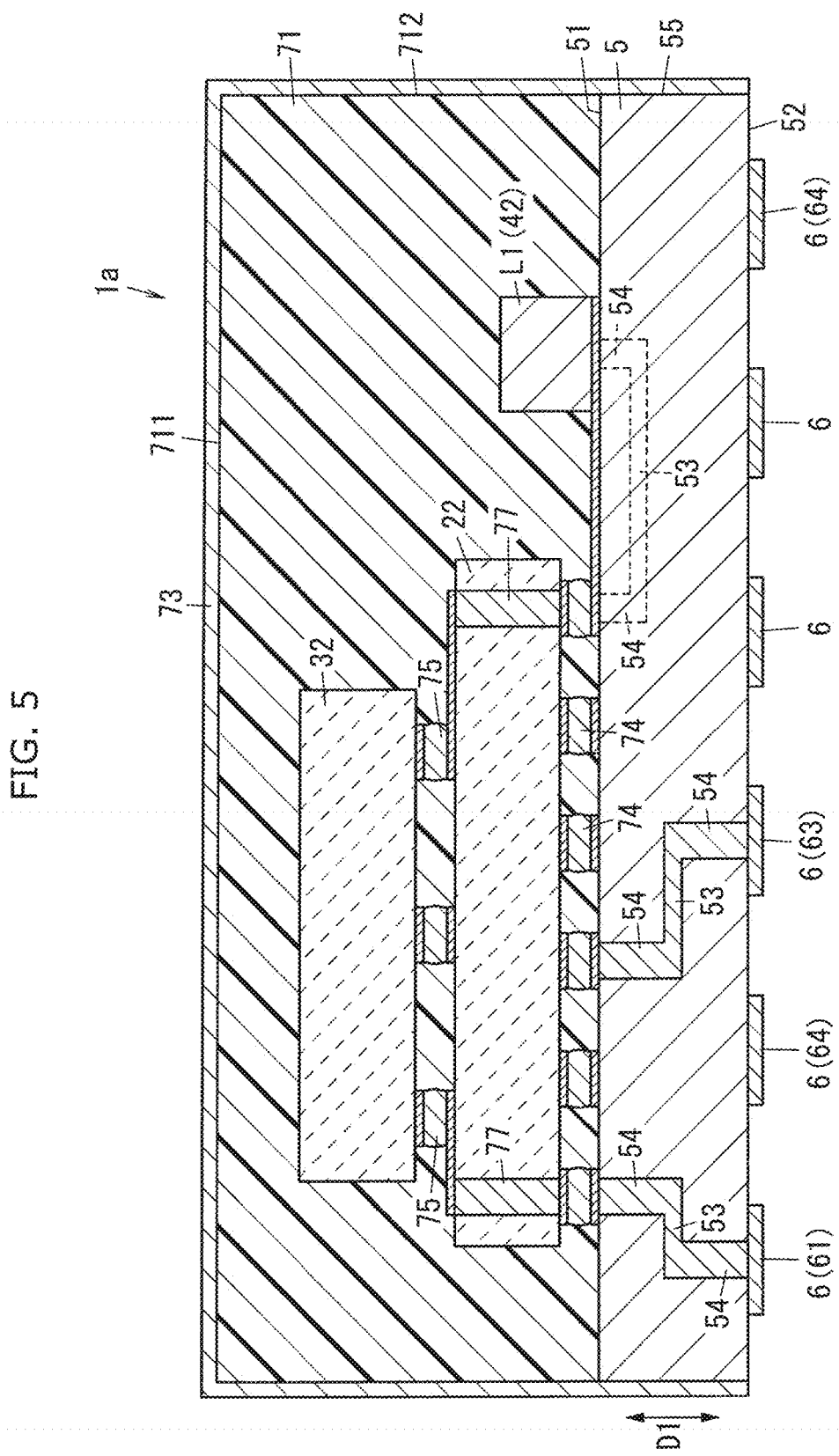
FIG. 5 is a cross sectional view of a radio frequency module according to Embodiment 2.

As illustrated in FIG. 5, radio frequency module 1a according to Embodiment 2 differs from radio frequency module 1 according to Embodiment 1 (see FIG. 2) in that radio frequency module 1a includes penetrating electrodes 77 electrically connected between reception filter 32 and inductor L1 in input matching circuit 42. In radio frequency module 1a according to Embodiment 2 and radio frequency module 1 according to Embodiment 1, like elements share like reference signs, and repeated description thereof will be omitted.

(1) Configuration

In radio frequency module 1a according to Embodiment 2, instead of line 76 (see FIG. 2) according to Embodiment 1, penetrating electrodes 77 like those illustrated in FIG. 5 are used to electrically connect reception filter 32 and inductor L1 in input matching circuit 42. This configuration can shorten the signal path between reception filter 32 and inductor L1, which makes it possible to inhibit the occurrence of parasitic capacitance between reception filter 32 and inductor L1. In this example, the penetrating electrodes pass through the low noise amplifier 22 in order to provide the shortened signal path.

Moreover, in radio frequency module 1a, another penetrating electrode 77 is used for electrical connection between antenna terminal 61 and reception filter 32, instead of line 76 (see FIG. 2) according to Embodiment 1. This configuration can shorten the signal path between antenna terminal 61 and reception filter 32, which makes it possible to inhibit the occurrence of parasitic capacitance between antenna terminal 61 and reception filter 32.

(2) Advantageous Effects

In radio frequency module 1a according to Embodiment 2, the occurrence of parasitic capacitance on the signal path between antenna terminal 61 and low noise amplifier 22 can be inhibited.

(3) Variations

As Variation 1 of Embodiment 2, like Variation 1 of Embodiment 1, radio frequency module 1a may include input matching circuit 42A (see FIG. 4B).

As Variation 2 of Embodiment 2, like Variation 2 of Embodiment 1, radio frequency module 1a may include input matching circuit 42B (see FIG. 4C).

Radio frequency module 1a according to each variation described above achieves the same advantageous effects as radio frequency module 1a according to Embodiment 2.

Embodiment 3

Figure 6:
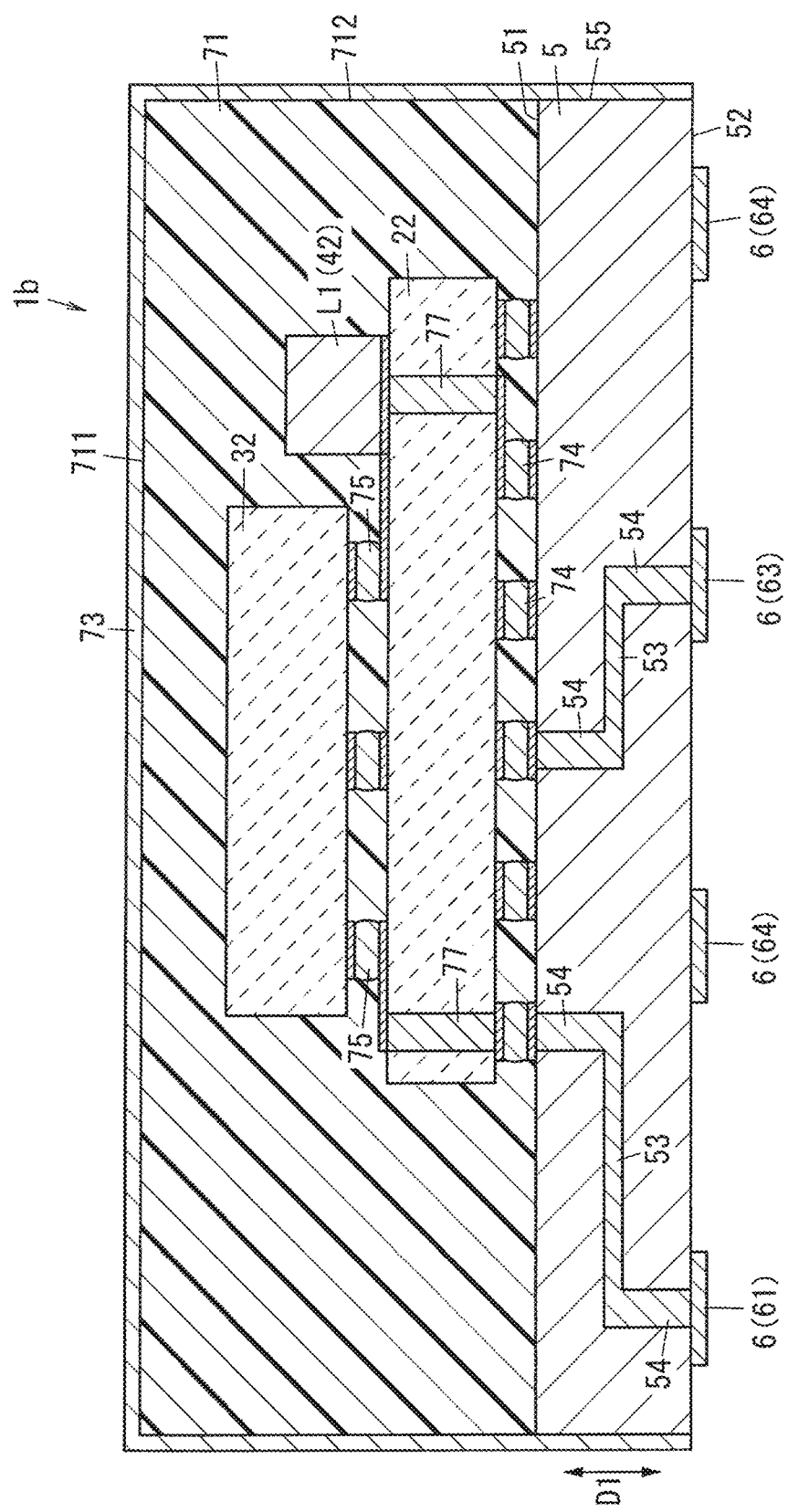
FIG. 6 is a cross sectional view of a radio frequency module according to Embodiment 3.

As illustrated in FIG. 6, radio frequency module 1b according to Embodiment 3 differs from radio frequency module 1 according to Embodiment 1 (see FIG. 2) in that inductor L1 in input matching circuit 42 is disposed on low noise amplifier 22. In radio frequency module 1b according to Embodiment 3 and radio frequency module 1 according to Embodiment 1, like elements share like reference signs, and repeated description thereof will be omitted.

(1) Configuration

In radio frequency module 1b according to Embodiment 3, inductor L1 in input matching circuit 42 is disposed on low noise amplifier 22. More specifically, inductor L1 is disposed adjacent to reception filter 32, on low noise amplifier 22. This configuration makes it possible to reduce the wiring length between inductor L1 and low noise amplifier 22, which makes it possible to reduce parasitic capacitance between inductor L1 and low noise amplifier 22. Consequently, with radio frequency module 1b according to Embodiment 3, it is possible to reduce the NF of low noise amplifier 22. Since inductor L1 according to Embodiment 3 has the same configuration and function as inductor L1 according to Embodiment 1 (see FIG. 2), repeated description will be omitted.

(2) Advantageous Effects

In radio frequency module 1b according to Embodiment 3, inductor L1 in input matching circuit 42 is disposed on low noise amplifier 22. This allows for a reduction in mounting area on mounting board 5 while maintaining a configuration in which inductor L1 is adjacent to low noise amplifier 22. In this context, inductor L1 is adjacent to low noise amplifier 22 by abutting low noise amplifier 22.

(3) Variations

As Variation 1 of Embodiment 3, like Variation 1 of Embodiment 1, radio frequency module 1b may include input matching circuit 42A (see FIG. 4B).

As Variation 2 of Embodiment 3, like Variation 2 of Embodiment 1, radio frequency module 1b may include input matching circuit 42B (see FIG. 4C).

Radio frequency module 1b according to each variation described above achieves the same advantageous effects as radio frequency module 1b according to Embodiment 3.

Embodiment 4

Figure 7:
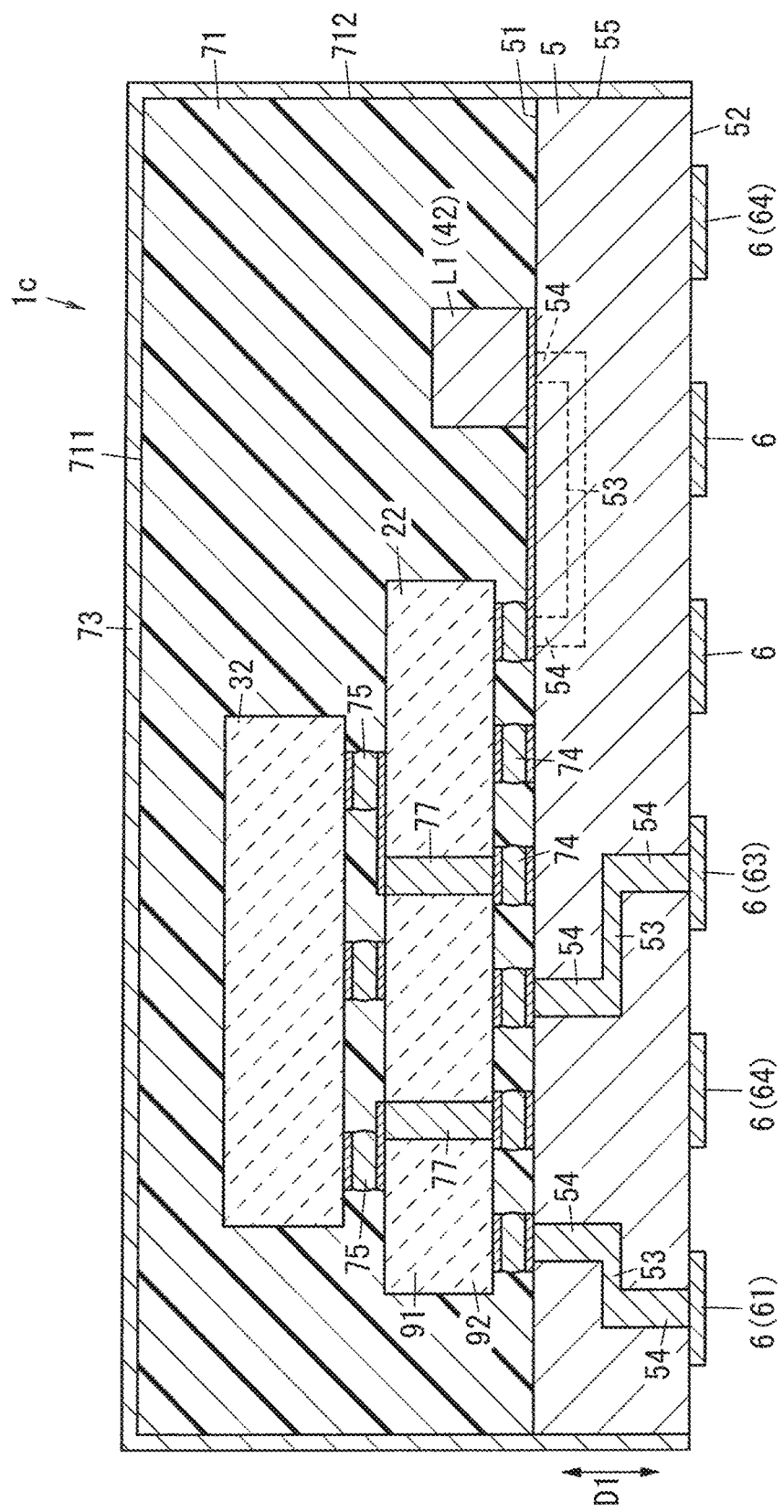
FIG. 7 is a cross sectional view of a radio frequency module according to Embodiment 4.

As illustrated in FIG. 7, radio frequency module 1c according to Embodiment 4 differs from radio frequency module 1 according to Embodiment 1 (see FIG. 2) in that low noise amplifier 22 is configured as a single chip with switches. In radio frequency module 1c according to Embodiment 4 and radio frequency module 1 according to Embodiment 1, like elements share like reference signs, and repeated description thereof will be omitted.

(1) Radio Frequency Module Circuit Configuration

Figure 8:
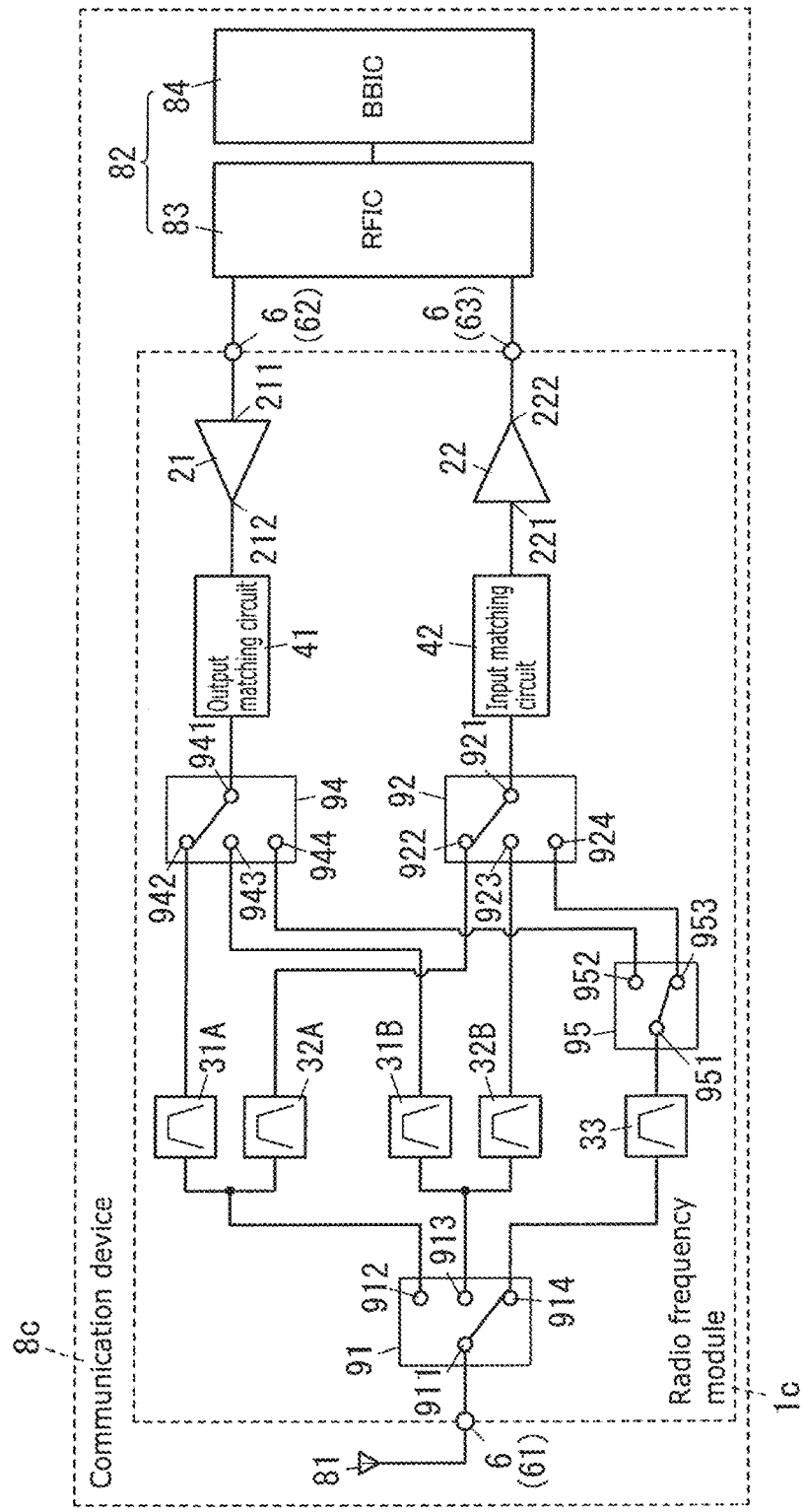
FIG. 8 is a schematic diagram of a communication device according to Embodiment 4.

As illustrated in FIG. 8, radio frequency module 1c according to Embodiment 4 includes first switch 91, second switch 92, and switches 94 and 95.

(1.1) First Switch

First switch 91 is a switch that switches the filter that is connected to antenna 81. First switch 91 includes common terminal 911 and three selection terminals 912 through 914. Common terminal 911 is connected to antenna terminal 61. Antenna 81 is connected to antenna terminal 61. Selection terminal 912 is connected to a connection point of the output terminal of transmission filter 31A and the input terminal of reception filter 32A. Selection terminal 913 is connected to a connection point of the output terminal of transmission filter 31B and the input terminal of reception filter 32B. Selection terminal 914 is connected to transceiving filter 33. For example, first switch 91 is a switch that can connect common terminal 911 to at least one of the three selection terminals 912 through 914. Here, first switch 91 is a switch capable of one-to-one connection and one-to-many connection, for example.

For example, first switch 91 is controlled by signal processing circuit 82. First switch 91 switches the connectivity between common terminal 911 and the three selection terminals 912 through 914 according to a control signal from RF signal processing circuit 83 in signal processing circuit 82. For example, first switch 91 is a switch integrated circuit (IC).

(1.2) Second Switch

Second switch 92 is a switch that switches the filter that is connected to input matching circuit 42. Second switch 92 includes common terminal 921 and three selection terminals 922 through 924. Common terminal 921 is connected to input terminal 221 of low noise amplifier 22 via input matching circuit 42. Selection terminal 922 is connected to the output terminal of reception filter 32A. Selection terminal 923 is connected to the output terminal of reception filter 32B. Selection terminal 924 is connected to selection terminal 953 of switch 95. For example, second switch 92 is a switch that can connect common terminal 921 to at least one of the three selection terminals 922 through 924. Here, second switch 92 is a switch capable of one-to-one connection and one-to-many connection, for example.

For example, second switch 92 is controlled by signal processing circuit 82. Second switch 92 switches the connectivity between common terminal 921 and the three selection terminals 922 through 924 according to a control signal from RF signal processing circuit 83 in signal processing circuit 82. For example, second switch 92 is a switch IC.

(1.3) Switch

Switch 94 is a switch that switches the filter that is connected to output matching circuit 41. Switch 94 includes common terminal 941 and three selection terminals 942 through 944. Common terminal 941 is connected to output terminal 212 of power amplifier 21 via output matching circuit 41. Selection terminal 942 is connected to the input terminal of transmission filter 31A. Selection terminal 943 is connected to the input terminal of transmission filter 31B. Selection terminal 944 is connected to selection terminal 952 of switch 95. For example, switch 94 is a switch that can connect common terminal 941 to at least one of the three selection terminals 942 through 944. Here, switch 94 is a switch capable of one-to-one connection and one-to-many connection, for example.

For example, switch 94 is controlled by signal processing circuit 82. Switch 94 switches the connectivity between common terminal 941 and the three selection terminals 942 through 944 according to a control signal from RF signal processing circuit 83 in signal processing circuit 82. For example, switch 94 is a switch IC.

(1.4) Switch

Switch 95 includes common terminal 951 and two selection terminals 952 and 953. Common terminal 951 is connected to the input/output terminal of transceiving filter 33. Selection terminal 952 is connected to selection terminal 944 of switch 94. Selection terminal 953 is connected to selection terminal 924 of second switch 92. In switch 95, the two selection terminals 952 and 953 mutually exclusively connect to common terminal 951. For example, switch 95 is configured as a single pole double throw (SPDT) switch. For example, switch 95 is a switch IC.

Since radio frequency module 1 includes switch 95, for example, concurrent transmission and reception of a transmission signal of a predetermined frequency band (i.e., a radio frequency signal for transmission) and a reception signal of a predetermined frequency band (i.e., a radio frequency signal for reception) can be quasi-achieved via time division duplex (TDD). Here, "quasi-achieved" means that transmission of a transmission signal and reception of a reception signal are technically not concurrent, but are performed within a short enough period to be regarded as concurrent.

(2) Radio Frequency Module Structure

In radio frequency module 1c according to Embodiment 4, low noise amplifier 22 is configured as a single chip with first switch 91 and second switch 92. Stated differently, low noise amplifier 22, first switch 91, and second switch 92 are configured as a single IC.

(3) Advantageous Effects

In radio frequency module 1c according to Embodiment 4, low noise amplifier 22 is configured as a single chip with switches (first switch 91 and second switch 92). This makes it possible to miniaturize radio frequency module 1c.

(4) Variations

As Variation 1 of Embodiment 4, low noise amplifier 22 may be configured as a single chip with first switch 91 or second switch 92. In other words, low noise amplifier 22 may be configured as a single chip with at least one of first switch 91 and second switch 92.

As Variation 2 of Embodiment 4, like Variation 1 of Embodiment 1, radio frequency module 1c may include input matching circuit 42A (see FIG. 4B).

As Variation 3 of Embodiment 4, like Variation 2 of Embodiment 1, radio frequency module 1c may include input matching circuit 42B (see FIG. 4C).

Radio frequency module 1c according to each variation described above achieves the same advantageous effects as radio frequency module 1c according to Embodiment 4.

Embodiment 5

Figure 9:
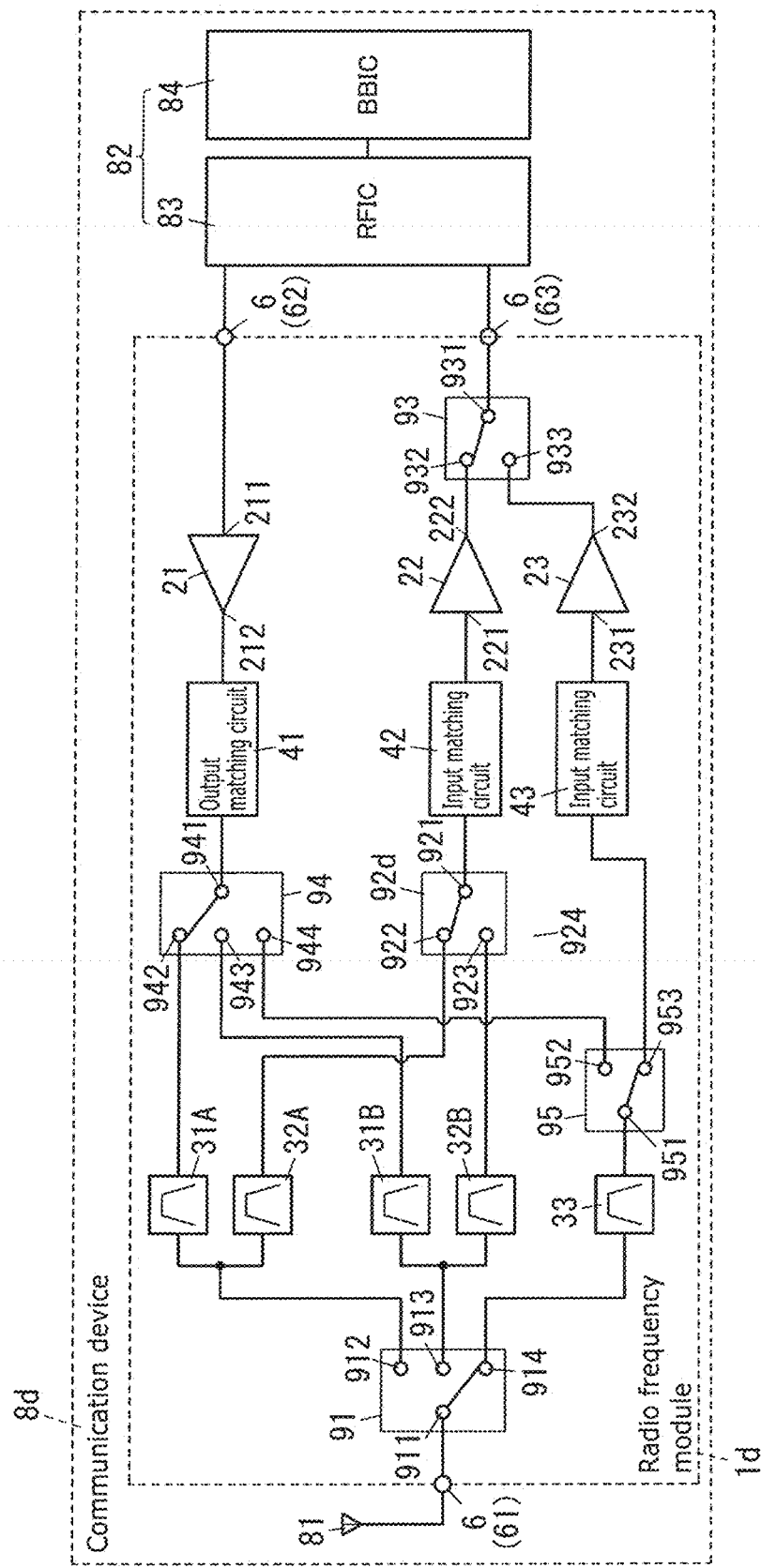
FIG. 9 is a schematic diagram of a communication device according to Embodiment 5.

As illustrated in FIG. 9, radio frequency module 1d according to Embodiment 5 differs from radio frequency module 1c according to Embodiment 4 (see FIG. 8) in that radio frequency module 1d includes third switch 93. In radio frequency module 1d according to Embodiment 5 and radio frequency module 1c according to Embodiment 4, like elements share like reference signs, and repeated description thereof will be omitted.

(1) Radio Frequency Module Circuit Configuration

As illustrated in FIG. 9, radio frequency module 1d according to Embodiment 5 includes third switch 93.

Third switch 93 is a switch that switches the low noise amplifier that is connected to output terminal 63. Third switch 93 includes common terminal 931 and two selection terminals 932 and 933. Common terminal 931 is connected to output terminal 63. Selection terminal 932 is connected to output terminal 222 of low noise amplifier 22. Selection terminal 933 is connected to output terminal 232 of low noise amplifier 23. For example, third switch 93 is a switch that can connect common terminal 931 to either of the two selection terminals 932 and 933.

For example, third switch 93 is controlled by signal processing circuit 82. Third switch 93 switches the connectivity between common terminal 931 and the two selection terminals 932 and 933 according to a control signal from RF signal processing circuit 83 in signal processing circuit 82. For example, third switch 93 is a switch integrated circuit (IC).

(2) Radio Frequency Module Structure

In radio frequency module 1d according to Embodiment 5, low noise amplifier 22 is configured as a single chip with first switch 91, second switch 92, and third switch 93. Stated differently, low noise amplifier 22, first switch 91, second switch 92d, and third switch 93 are configured as a single IC.

(3) Advantageous Effects

In radio frequency module 1d according to Embodiment 5, low noise amplifiers 22 and 23 are configured as a single chip with switches (first switch 91, second switch 92d, and third switch 93). This makes it possible to miniaturize radio frequency module 1d.

(4) Variations

As Variation 1 of Embodiment 5, low noise amplifier 22 may be configured as a single chip with first switch 91 or second switch 92d. In other words, low noise amplifier 22 may be configured as a single chip with at least one of first switch 91 and second switch 92.

As Variation 2 of Embodiment 5, like Variation 1 of Embodiment 1, radio frequency module 1d may include input matching circuit 42A (see FIG. 4B).

As Variation 3 of Embodiment 5, like Variation 2 of Embodiment 1, radio frequency module 1d may include input matching circuit 42B (see FIG. 4C).

Radio frequency module 1d according to each variation described above achieves the same advantageous effects as radio frequency module 1d according to Embodiment 5.

Embodiment 6

Figure 10:
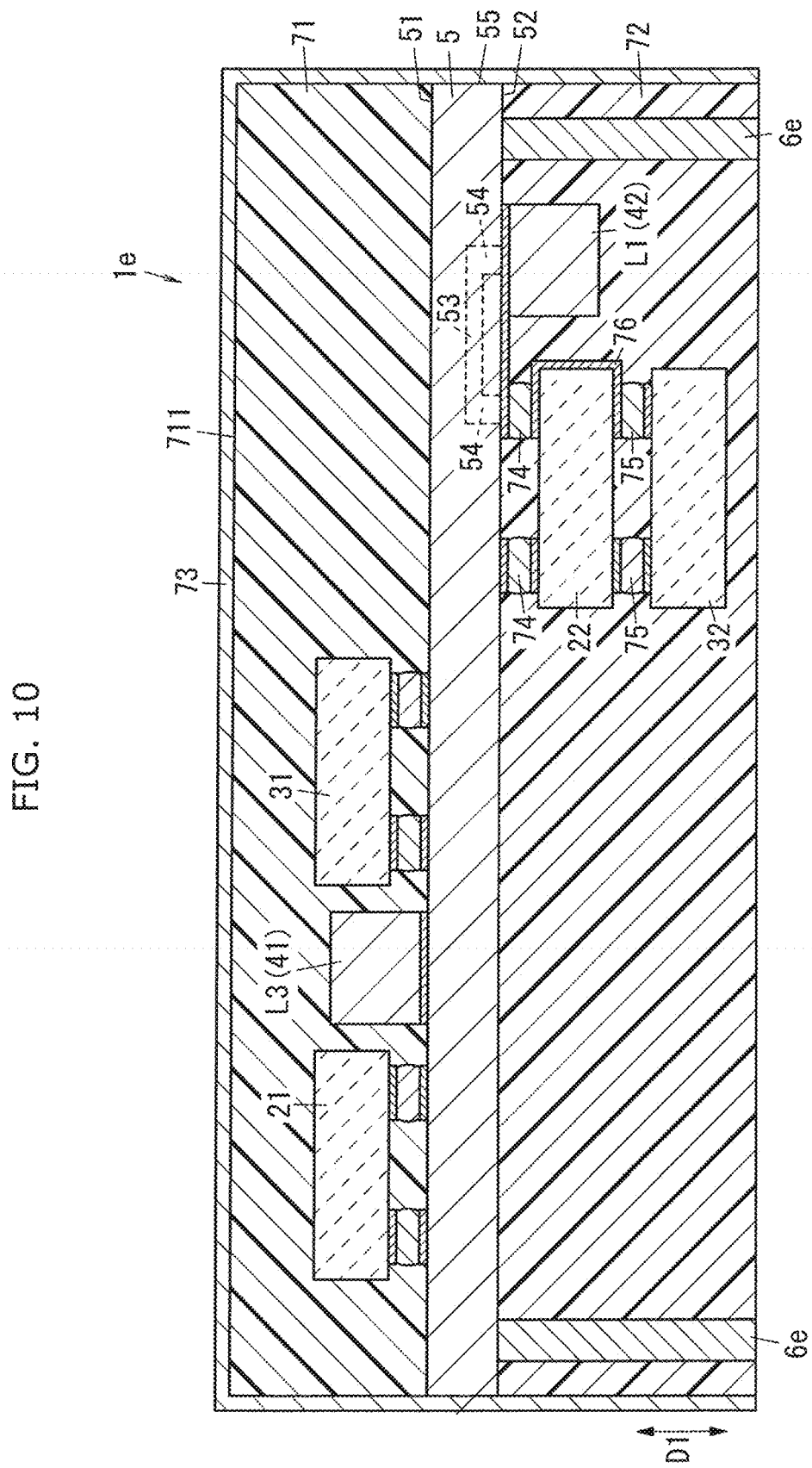
FIG. 10 is a cross sectional view of a radio frequency module according to Embodiment 6.

As illustrated in FIG. 10, radio frequency module 1e according to Embodiment 6 differs from radio frequency module 1 according to Embodiment 1 (see FIG. 2) in that circuit elements are disposed on both surfaces of mounting board 5. In radio frequency module 1e according to Embodiment 6 and radio frequency module 1 according to Embodiment 1, like elements share like reference signs, and repeated description thereof will be omitted.

(1) Radio Frequency Module Circuit Configuration

In radio frequency module 1e according to Embodiment 6, low noise amplifier 22, reception filter 32, and inductor L1 are disposed on the second principal surface 52 side of mounting board 5. Since low noise amplifier 22, reception filter 32, and inductor L1 according to Embodiment 6 have the same configuration and function as low noise amplifier 22, reception filter 32, and inductor L1 according to Embodiment 1 (see FIG. 2), repeated description will be omitted.

(2) Radio Frequency Module Structure

Radio frequency module 1e further includes second resin component 72.

(2.1) Second Resin Component

As illustrated in FIG. 10, second resin component 72 is disposed on second principal surface 52 of mounting board 5, and covers the plurality of circuit elements disposed on second principal surface 52 as well as second principal surface 52. Second resin component 72 functions to ensure the reliability of mechanical strength (impact resistance) and moisture resistance and the like of circuit elements disposed on second principal surface 52. In other words, second resin component 72 functions to protect circuit elements disposed on second principal surface 52. Second resin component 72 may include a filler in addition to resin. Second resin component 72 may be made of the same material as first resin component 71. Alternatively, second resin component 72 may be made of a different material than first resin component 71.

(2.2) Arrangement

In radio frequency module 1e according to Embodiment 6, low noise amplifier 22, reception filter 32, and inductor L1 are disposed on the second principal surface 52 side of mounting board 5, whereas power amplifier 21, inductor L3, and transmission filter 31 are disposed on the first principal surface 51 side of mounting board 5.

In Embodiment 6, transmission filter 31, which is provided on the signal path for transmission signals, and low noise amplifier 22, which is provided on the signal path for reception signals, are provided separated from each other. This makes it possible to improve the isolation of transmission filter 31 provided on the signal path for transmission signals and low noise amplifier 22 provided on the signal path for reception signals.

(3) Advantageous Effects

In radio frequency module 1e according to Embodiment 6, low noise amplifier 22, reception filter 32, and inductor L1 are disposed on the second principal surface 52 side of mounting board 5. This makes it possible to efficiently mount a plurality of circuit elements on mounting board 5.

(4) Variations

As Variation 1 of Embodiment 6, each of the plurality of external-connection terminals 6 is not limited to being a columnar electrode, and may be, for example, an external-connection terminal having a bump structure. As used herein, a bump is, for example, a sphere. In such cases, each of the plurality of external-connection terminals 6 is a ball bump. For example, the ball bumps are made of gold, copper, or solder or the like.

In Variation 1, the plurality of external-connection terminals 6e are disposed on second principal surface 52 of mounting board 5, just like in Embodiment 6. However, in radio frequency module 1e according to this variation, second resin component 72 (see FIG. 10) can be omitted.

As Variation 2 of Embodiment 6, like Variation 1 of Embodiment 1, radio frequency module 1e may include input matching circuit 42A (see FIG. 4B).

As Variation 3 of Embodiment 6, like Variation 2 of Embodiment 1, radio frequency module 1e may include input matching circuit 42B (see FIG. 4C).

Radio frequency module 1e according to each variation described above achieves the same advantageous effects as radio frequency module 1e according to Embodiment 6.

Variations of Embodiments 1 to 6

As one variation of Embodiments 1 through 6, in radio frequency modules 1 and 1a through 1e, transmission filter 31 and reception filter 32 are not limited to being SAW filters (surface acoustic wave filters), and may be filters other than SAW filters. For example, transmission filter 31 and reception filter 32 may be acoustic wave filters that use bulk acoustic waves (BAW) (i.e., BAW filters), and, alternatively, may be either LC resonance filters or dielectric filters.

With radio frequency modules 1a through 1e according to this variation, even when reception filter 32 is a BAW filter, filtering characteristics can be improved just the same as when reception filter 32 is a SAW filter.

Moreover, when transmission filter 31 and reception filter 32 are configured as acoustic wave filters, it is possible to improve attenuation characteristics in the vicinity of the passband, more so than when transmission filter 31 and reception filter 32 are configured as LC filters. Moreover, when transmission filter 31 and reception filter 32 are configured as acoustic wave filters, it is possible to increase r (reflection coefficient) in the midband, more so than when transmission filter 31 and reception filter 32 are configured as LC filters.

Radio frequency modules 1 and 1a through 1e may include a power amplifier controller that controls power amplifier 21 based on a control signal from signal processing circuit 82. The power amplifier controller is, for example, a chip component (IC chip) that includes a substrate including a first principal surface and a second principal surface on opposite sides, and a controlling function part formed on the first principal surface side of the substrate. Here, the substrate is, for example, a silicon substrate.

Moreover, the substrate of power amplifier 21 is not limited to a gallium arsenide substrate, and may be a silicon substrate. In such cases, the transistor included in power amplifier 21 is not an HBT but rather a bipolar transistor.

It is sufficient if each of first switch 91, second switch 92, third switch 93, switch 94, and switch 95 includes two or more selection terminals; the number of terminals is not limited to the examples above.

The embodiments and variations described above are merely some of the various embodiments and variations of the present disclosure. So long as an embodiment or variation can achieve the object of the disclosure, various changes may be made thereto depending on design, for example.

Aspects

The following aspects are disclosed by the present specification.

A radio frequency module (1; 1a through 1e) according to a first aspect includes a mounting board (5), a low noise amplifier (22; 23), a reception filter (32; 32A, 32B), and an input matching circuit (42; 43). The low noise amplifier (22; 23) is mounted on the mounting board (5). The reception filter (32; 32A; 32B) is connected to the low noise amplifier (22; 23). The input matching circuit (42; 43) is provided on a signal path between the reception filter (32; 32A, 32B) and the low noise amplifier (22; 23). The input matching circuit (42; 43) includes at least one inductor (L1). The reception filter (32; 32A, 32B) is disposed on the low noise amplifier (22; 23). The inductor (L1) included in the input matching circuit (42; 43) is adjacent to the low noise amplifier (22; 23).

With the radio frequency module (1; 1a through 1e) according to the first aspect, it is possible to reduce the wiring length between the inductor (L1) included in the input matching circuit (42; 43) and the low noise amplifier (22; 23), which makes it possible to inhibit the occurrence of parasitic capacitance between the inductor (L1) and the low noise amplifier (22; 23). This consequently makes it possible to reduce the noise figure (NF) of the low noise amplifier (22; 23).

In a radio frequency module (1; 1a through 1e) according to a second aspect, in the first aspect, the input matching circuit (42; 43) includes a plurality of the inductors (L1, L2). Among the plurality of inductors (L1, L2), the inductor (L1) closest to the low noise amplifier (22; 23) is adjacent to the low noise amplifier (22; 23).

With the radio frequency module (1; 1a through 1e) according to the second aspect, even when the input matching circuit (42; 43) includes a plurality of inductors (L1, L2), it is possible to inhibit the occurrence of parasitic capacitance between the inductor (L1) and the low noise amplifier (22; 23). This consequently reduces the NF of the low noise amplifier (22; 23).

In a radio frequency module (1e) according to a third aspect, in the first or second aspect, the mounting board (5) includes a first principal surface (51) and a second principal surface (52) on opposite sides of the mounting board (5). The radio frequency module (1e) further includes an external-connection terminal (6e). The external-connection terminal (6e) is provided on the second principal surface (52) of the mounting board (5). The low noise amplifier (22; 23), the reception filter (32; 32A, 32B), and the inductor (L1) are disposed on the second principal surface (52) side of the mounting board (5).

With the radio frequency module (1e) according to the third aspect, it possible to efficiently mount a plurality of circuit elements on the mounting board (5).

In a radio frequency module (1; 1a; 1c through 1e) according to a fourth aspect, in any one of the first through third aspects, the inductor (L1) is disposed on the mounting board (5).

With the radio frequency module (1; 1a; 1c through 1e) according to the fourth aspect, the relatively tall inductor (L1) can be disposed adjacent to the low noise amplifier (22; 23).

In a radio frequency module (1b) according to a fifth aspect, in any one of the first through third aspects, the inductor (L1) is disposed on the low noise amplifier (22; 23).

With the radio frequency module (1b) according to the fifth aspect, the inductor (L1) can be disposed adjacent to the low noise amplifier (22; 23) and the mounting area on the mounting board (5) can be reduced.

In a radio frequency module (1c; 1d) according to a sixth aspect, in any one of the first through fifth aspects, the radio frequency module (1c; 1d) further includes at least one switch from among a first switch (91), a second switch (92; 92d), and a third switch (93). The first switch (91) is configured to switch a filter that is connected to an antenna (81). The second switch (92; 92d) is configured to switch a filter that is connected to the input matching circuit (42; 43). The third switch (93) is configured to switch a low noise amplifier (22; 23) that is connected to the output terminal (63). The low noise amplifier (22; 23) and the at least one switch are included in a single chip.

With the radio frequency module (1c; 1d) according to the sixth aspect, it is possible to miniaturize the radio frequency module (1c; 1d).

In a radio frequency module (1; 1a through 1e) according to a seventh aspect, in any one of the first through sixth aspects, the reception filter (32; 32A, 32B) is a SAW filter or a BAW filter.

With the radio frequency module (1; 1a through 1e) according to the seventh aspect, it is possible to improve filtering characteristics.

In a radio frequency module (1; 1a through 1e) according to an eighth aspect, in any one of the first through seventh aspects, the low noise amplifier (22; 23) is formed using a SOI substrate or a SiGe substrate.

With the radio frequency module (1; 1a through 1e) according to the eighth aspect, it is possible to reduce noise.

In a radio frequency module (1; 1a through 1e) according to a ninth aspect, in any one of the first through eighth aspects, the inductor (L1) is at least part of a surface mount component or an integrated passive device.

In a radio frequency module (1; 1a through 1e) according to a tenth aspect, in any one of the first through ninth aspects, the radio frequency module (1; 1a through 1e) further includes a transmission filter (31; 31A, 31B).

With the radio frequency module (1; 1a through 1e) according to the tenth aspect, it is possible to achieve a miniature size by implementing a configuration that includes not only a reception function but a transmission function as well.

In a communication device (8; 8c; 8d) according to an eleventh aspect, in any one of the first through tenth aspects, the communication device (8; 8c; 8d) further includes a radio frequency module (1; 1a through 1e) and a signal processing circuit (82). The signal processing circuit (82) processes a reception signal from the radio frequency module (1; 1a through 1e).

With the communication device (8; 8c; 8d) according to the eleventh aspect, in the radio frequency module, since it is possible to reduce the wiring length between the inductor (L1) included in the input matching circuit (42; 43) and the low noise amplifier (22; 23), it is possible to inhibit the occurrence of parasitic capacitance between the inductor (L1) and the low noise amplifier (22; 23). This consequently reduces the NF of the low noise amplifier (22; 23).

The invention claimed is:

1. A radio frequency module, comprising:
   a mounting board;
   a low noise amplifier mounted on the mounting board;
   a reception filter connected to the low noise amplifier;
   an input matching circuit provided on a signal path between the reception filter and the low noise amplifier, the input matching circuit including at least one inductor;
   a first columnar electrode that connects to the low noise amplifier and extends into the mounting board in a thickness direction of the mounting board;
   a second columnar electrode that connects to the input matching circuit and extends into the mounting board in the thickness direction of the mounting board; and
   a conductive pattern that interconnects the first columnar electrode to the second columnar electrode and extends substantially parallel to a surface of the mounting board at a predetermined depth within the mounting board so as to suppress a parasitic capacitance between the low noise amplifier and the at least one inductor in the input matching circuit and corresponding noise figure of the low noise amplifier,
   wherein the reception filter is disposed on the low noise amplifier, and
   the at least one inductor included in the input matching circuit is adjacent to the low noise amplifier such that no other circuit element is present between the low noise amplifier and the at least one inductor included in the input matching circuit.

2. The radio frequency module according to claim 1, wherein the at least one inductor comprises a plurality of inductors, and
   among the plurality of inductors, the inductor closest to the low noise amplifier is adjacent to the low noise amplifier.

3. The radio frequency module according to claim 1, wherein the mounting board includes a first principal surface and a second principal surface on opposite sides of the mounting board,
   the radio frequency module further comprises an external-connection terminal on the second principal surface of the mounting board, and
   the low noise amplifier, the reception filter, and the at least one inductor are disposed on the second principal surface side of the mounting board.

4. The radio frequency module according to claim 1, wherein the at least one inductor is disposed on the mounting board.

5. The radio frequency module according to claim 1, wherein the at least one inductor is disposed on the low noise amplifier.

6. The radio frequency module according to claim 1, further comprising:
   at least one switch from among a first switch configured to switch a filter that is connected to an antenna, a second switch configured to switch a filter that is connected to the input matching circuit, and a third switch configured to switch a low noise amplifier that is connected to an output terminal,
   wherein the low noise amplifier and the at least one switch are included in a single chip.

7. The radio frequency module according to claim 1, wherein the reception filter is a surface acoustic wave (SAW) filter or a bulk acoustic wave (BAW) filter.

8. The radio frequency module according to claim 1, wherein the low noise amplifier is formed using a silicon on insulator (SOI) substrate or a SiGe substrate.

9. The radio frequency module according to claim 1, wherein the at least one inductor is at least part of a surface mount component or an integrated passive device.

10. The radio frequency module according to claim 1, further comprising:
    a transmission filter.

11. The radio frequency module according to claim 1, further comprising:
    a power amplifier configured to amplify a transmit signal.

12. The radio frequency module according to claim 11, wherein
    the power amplifier is mounted to a same side of the mounting board as the low noise amplifier.

13. A communication device, comprising:
    the radio frequency module; and
    a signal processing circuit configured to process a reception signal from the radio frequency module, wherein the radio frequency module comprising
    a mounting board,
    a low noise amplifier mounted on the mounting board,
    a reception filter connected to the low noise amplifier,
    an input matching circuit provided on a signal path between the reception filter and the low noise amplifier, the input matching circuit including at least one inductor,
    a first columnar electrode that connects to the low noise amplifier and extends into the mounting board in a thickness direction of the mounting board,
    a second columnar electrode that connects to the input matching circuit and extends into the mounting board in the thickness direction of the mounting board, and
    a conductive pattern that interconnects the first columnar electrode to the second columnar electrode and extends substantially parallel to a surface of the mounting board at a predetermined depth within the mounting board so as to suppress a parasitic capacitance between the low noise amplifier and the at least one inductor in the input matching circuit and corresponding noise figure of the low noise amplifier,
    wherein the reception filter is disposed on the low noise amplifier, and
    the at least one inductor included in the input matching circuit is adjacent to the low noise amplifier such that no other circuit element is present between the low noise amplifier and the at least one inductor included in the input matching circuit.

14. The communication device according to claim 13, wherein
    the at least one inductor comprises a plurality of inductors, and
    among the plurality of inductors, the inductor closest to the low noise amplifier is adjacent to the low noise amplifier.

15. The communication device according to claim 13, wherein
    the mounting board includes a first principal surface and a second principal surface on opposite sides of the mounting board,
    the radio frequency module further comprises an external-connection terminal on the second principal surface of the mounting board, and
    the low noise amplifier, the reception filter, and the at least one inductor are disposed on the second principal surface side of the mounting board.

16. The communication device according to claim 13, wherein
    the at least one inductor is disposed on the mounting board.

17. The communication device according to claim 13, wherein
    the at least one inductor is disposed on the low noise amplifier.

18. The communication device according to claim 13, wherein the radio frequency module further comprising:
    at least one switch from among a first switch configured to switch a filter that is connected to an antenna, a second switch configured to switch a filter that is connected to the input matching circuit, and a third switch configured to switch a low noise amplifier that is connected to an output terminal,
    wherein the low noise amplifier and the at least one switch are included in a single chip.

19. The communication device according to claim 13, wherein
    the reception filter is a surface acoustic wave (SAW) filter or a bulk acoustic wave (BAW) filter.

20. The communication device according to claim 13, wherein
    the low noise amplifier is formed using a silicon on insulator (SOI) substrate or a SiGe substrate.

* * * * *